United States Patent [19]

Redmore et al.

[11] Patent Number: 4,857,205

[45] Date of Patent: Aug. 15, 1989

[54] METHOD FOR INHIBITION OF SCALE FORMATION

[75] Inventors: Derek Redmore; Balram Dhawan; John L. Przybylinski, all of St. Louis, Mo.

[73] Assignee: Petrolite Corporation, St. Louis, Mo.

[21] Appl. No.: 158,830

[22] Filed: Feb. 22, 1988

[51] Int. Cl.$^4$ ............................................. C02F 5/14
[52] U.S. Cl. ................................. 210/700; 252/180; 166/279
[58] Field of Search ............... 166/279, 310; 210/699, 210/700; 252/180, 181; 260/502.4 P, 502.5 F

[56] References Cited

U.S. PATENT DOCUMENTS

| | | | |
|---|---|---|---|
| 4,051,110 | 9/1977 | Quinlan | 252/8.55 B |
| 4,071,464 | 1/1978 | Quinlan | 252/180 |
| 4,084,950 | 4/1978 | Quinlan | 71/67 |
| 4,088,574 | 11/1976 | Quinlan | 252/180 |
| 4,187,245 | 2/1980 | Redmore et al. | 260/502.5 |
| 4,234,511 | 11/1980 | Buckman | 260/502.5 |
| 4,489,203 | 12/1984 | Wilson et al. | 544/337 |
| 4,551,262 | 11/1985 | Samakaev et al. | 210/700 |
| 4,602,683 | 7/1986 | Meyers | 166/279 |

FOREIGN PATENT DOCUMENTS 2531104 4/1976 Fed. Rep. of Germany .

OTHER PUBLICATIONS

"Oilfield Chemicals", by R. K. Samakaev, 33-F0368, Apr. 1986, p. 8.
"Oilfield Chemicals", by D. Kisil, 33-F0369, Apr. 1986, p. 8.

Primary Examiner—Peter Hruskoci
Attorney, Agent, or Firm—Kenneth Solomon

[57] ABSTRACT

A method for inhibition of scale formation using a composition comprising an N-phosphonomethylated amino-2-hydroxypropylene polymer having a molecular weight of between about 300 and about 5000 and having the structural formula

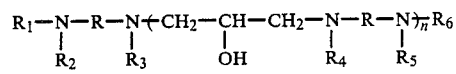

wherein (i) $R_1$, $R_2$, $R_3$, $R_4$, $R_5$ and $R_6$ are independently selected from the group consisting of hydrogen, phosphonomethyl radical corresponding to the formula —$CH_2PO(OH)_2$, and water treating acceptable salts of such phosphonomethyl radical, with the proviso that the percentage of $R_1$, $R_2$, $R_3$, $R_4$, $R_5$ and $R_6$ being hydrogen does not exceed about 30; (ii) R is a divalent radical selected from the group consisting of (a) unsubstituted alkylene groups having at least about 2 and at most about 12 carbon atoms, (b) substituted alkylene groups having at least about 2 and at most about 12 carbon atoms wherein at least one hydrogen of the alkylene group is substituted with a radical selected from the group consisting of methyl, ethyl, propyl, butyl, methyl ammonium, ethyl ammonium and ammonium groups, and the other hydrogens of the substituted alkylene group are unsubstituted, (c) cycloalkylene groups having at least 3 and at most about 12 carbon atoms, and (d) —R'—N—R"— wherein $R_7$ is defined as $R_1$, $R_2$, $R_3$, $R_4$, $R_5$ and $R_6$ above, with the proviso that the percentage of $R_1$, $R_2$, $R_3$, $R_4$, $R_5$, $R_6$ and $R_7$ being hydrogen not exceed about 30, and R' and R" are independently selected from the group consisting of such unsubstituted alkylene groups, and such cycoalkylene groups; and (iii) n is from about 1 to about 25 is disclosed.

5 Claims, No Drawings

METHOD FOR INHIBITION OF SCALE FORMATION

BACKGROUND OF THE INVENTION

1. Field of the Invention

This invention relates to compositions and methods for inhibiting barite scale formation, and more particularly to compositions and methods for inhibiting barite scale formation in acidic environments.

2. Prior Art

A common problem encountered in industrial activities and activities involving transport of water or transport of aqueous mixtures is the formation of scale on equipment, particularly on the inside surfaces of conduits. Oil field brines, sea water and most commercial water contain a variety of alkaline earth metal cations, such as calcium, barium and strontium, as well as a variety anions such as bicarbonate, carbonate, sulfate, phosphate and silicate. When such ions are present in sufficient concentrations, they tend to combine to form precipitates. Scale, formed by the deposition of any of several types of such precipitates, including calcium carbonate, calcium sulfate and barium sulfate (barite), therefore tends to coat surfaces in contact with water. Buildup of such scale on, for example, the inside surfaces of conduits not only obstructs fluid flow, but also interferes with heat transfer across the surfaces, facilitates corrosion of the surfaces and harbors the growth of bacteria.

Conventionally, scale formation is inhibited by introducing a scale inhibiting composition to the aqueous environment. Various scale inhibiting compositions have been employed to inhibit scale formation, and several such compositions are illustrated in U.S. Pat. No. 4,187,245 to Redmore et al., U.S. Pat. No. 4,234,511 to Backman, and U.S. Pat. No. 4,051,110 to Quinlan. However, it has been discovered that although scale inhibiting compositions, such as those disclosed in the above-noted patents, have been found useful for inhibiting scale formation in pH neutral aqueous environments, they generally are substantially less effective in acidic environments. Thus, commercial scale inhibitors, such as the pentamethylene phosphonic acid of diethylenetriamine, that are effective in inhibiting barite scale formation in neutral pH environments at room temperature, have been found to be essentially inoperative in acidic environments. Moreover, many commercial scale inhibitors also have been found to degrade and to lose their effectiveness at elevated temperatures, e.g., temperatures greater than about 90° C. or higher. In addition, elevated temperatures have been found to encourage formation of certain scales, such as calcium carbonate and calcium sulfate. Other conventional scale inhibitors, particularly polyacrylic acids such as LMW45N, a polyacrylic acid sold by Rohm and Haas, have been employed in attempts to inhibit scale formation in acidic environments. However, even these compositions are unsatisfactory in preventing barite scale formation in acidic environments, and are even less effective in preventing formation of other scales, such as calcium sulfate, in such environments.

Increased North Sea sea water flooding activity has increased the need for developing a way to inhibit formation of barite scale in acidic environments, particularly at elevated temperatures. Since barite tenaciously adheres to surfaces and resists removal by commercial scale removers or inhibitors, it has been found to be one of the most troublesome of oil field scales. This problem has been exacerbated since the introduction of carbon dioxide to oil wells to enhance oil production tends to lower the pH of already acidic oil field brines.

Further, geothermal forces acting on oil in underground reserves heat the oil found in the North Sea oil fields so that the oil and water mixture in conduits leading from the reserves is of elevated temperature, often exceeding 140° C. Accordingly, methods are needed for inhibiting barite scale formation on surfaces in high temperature, acidic, aqueous environments, such as encountered in North Sea oil fields.

SUMMARY OF THE INVENTION

Briefly, therefore, the present invention is directed to a novel composition comprising an N-phosphonomethylated amino-2-hydroxypropylene polymer having a molecular weight of between about 300 and about 5000 and having the structural formula

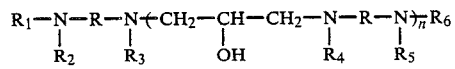

wherein (i) $R_1$, $R_2$, $R_3$, $R_4$, $R_5$ and $R_6$ are independently selected from the group consisting of hydrogen, phosphonomethyl radical corresponding to the formula $-CH_2PO(OH)_2$, and water treating acceptable salts of such phosphonomethyl radical, with the proviso that the percentage of $R_1$, $R_2$, $R_3$, $R_4$, $R_5$, and $R_6$ being hydrogen does not exceed about 30; (ii) R is a divalent radical selected from the group consisting of (a) unsubstituted alkylene groups having at least about 2 and at most about 12 carbon atoms, (b) substituted alkylene groups having at least about 2 and at most about 12 carbon atoms wherein at least one hydrogen of the alkylene group is substituted with a radical selected from the group consisting of methyl, ethyl, propyl, butyl, methyl ammonium, ethyl ammonium and ammonium groups, and the other hydrogens of the substituted alkylene group are unsubstituted, (c) cycloalkylene groups having at least 3 and at most about 12 carbon atoms, and (d)

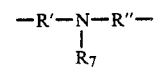

wherein R is defined as $R_1$, $R_2$, $R_3$, $R_4$, $R_5$ and $R_6$ above, with the proviso that the percentage of $R_1$, $R_2$, $R_3$, $R_4$, $R_5$, $R_6$, and $R_7$ being hydrogen does not exceed about 30, and R' and R'' are independently selected from the group consisting of such unsubstituted alkylene groups, such substituted alkylene groups and such cycloalkylene groups; and (iii) n is an integer from about 1 to about 25.

The present invention is also directed to a novel method for inhibiting of barite scale formation in an acidic, aqueous environment. The method comprises introducing a barite scale inhibiting composition to an acidic, aqueous environment that is susceptible to barite formation and has a pH of at least about 2 and at most about 8. The barite scale inhibiting composition comprises the novel N-phosphonomethylated amino-2-hydroxypropylene polymer set forth above.

The present invention is further directed to a novel method for preparation of a barite scale inhibiting composition useful for inhibiting formation of barite scale in an aqueous acidic environment. The method comprises reacting under aqueous conditions alkylene diamine with epihalohydrin in an alkylene diamine to epihalohydrin molar ratio of at least about 1 to produce a low molecular weight polymer. The alkylene diamine corresponds to the formula $NH_2-R-NH_2$, where R is a straight chain alkylene group having between about 2 and about 6 carbon atoms wherein one or more of the hydrogens of the alkylene group may be substituted with a methyl, ethyl, propyl, butyl, methyl ammonium, ethyl ammonium or ammonium group. The epihalohydrin corresponds to the formula:

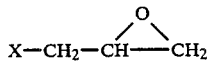

where X is a halogen such as chlorine, bromine, etc. Then the low molecular weight polymer is reacted with phosphorous acid and formaldehyde to produce a barite scale inhibiting composition comprising a polymeric aminomethylene phosphonic acid corresponding to the formula:

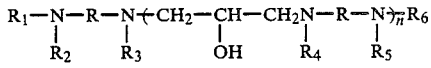

where R is a straight chain alkylene group having at least about 2 and at most about 6 carbon atoms wherein one or more of the hydrogens of the alkylene group may be substituted with a side group selected from the group consisting of methyl, ethyl, propyl, butyl, methyl ammonium, ethyl ammonium and ammonium groups, $R_1$, $R_2$, $R_3$, $R_4$, $R_5$ and $R_6$ are independently selected from the group consisting of hydrogen, phosphonomethyl radical corresponding to the formula $-CH_2PO(OH)_2$, and water treating acceptable salts of such phosphonomethyl radical, such that more than 0%, but less than about 30% of $R_1$, $R_2$, $R_3$, $R_4$, $R_5$ and $R_6$ in a mixture of the acid is hydrogen, and n is an integer from 1 to about 25.

Among the several advantages found to be achieved by the present invention, therefore, may be noted the provision of a method for inhibiting barite formation in acidic aqueous environments; and the provision of a method for inhibiting barite formation in such environments even at temperatures exceeding 30° C.; and the provision of compositions useful in such methods.

DETAILED DESCRIPTION OF THE PREFERRED EMBODIMENTS

In accordance with this invention, certain novel compositions have been discovered which are useful in a process by which barite scale formation in an aqueous environment of pH between about 2 and about 8 can be inhibited. Moreover, such compositions have been found effective in inhibiting barite scale formation even in acidic, aqueous environments of elevated temperature. In particular, such compositions have been found to be far more effective against barite as well as other scale formation even than the conventional compositions, such as Rohm and Haas' LMW45N, currently used for barite scale inhibition in acidic environments.

In the process, the acidic, aqueous environment is treated by introduction of a barite scale inhibiting composition comprising an N-phosphonomethylated amino-2-hydroxypropylene polymer having a molecular weight of between about 300 and about 5000 and having the structural formula

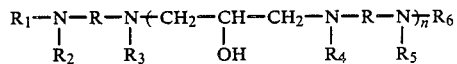

wherein (i) $R_1$, $R_2$, $R_3$, $R_4$, $R_5$, $R_6$ are independently selected from hydrogen, phosphonomethyl radical corresponding to the formula $-CH_2PO(OH)_2$, and water treating acceptable salts of such radical, with the proviso that no more than about 30% of $R_1$, $R_2$, $R_3$, $R_4$, $R_5$ and $R_6$ are hydrogen; (ii) R is a divalent radical selected from the group consisting of (a) unsubstituted alkylene groups having at least about 2 and at most about 12 carbon atoms, (b) substituted alkylene groups having at least about 2 and at most about 12 carbon atoms wherein at least one hydrogen of the alkylene group is substituted with a radical selected from the group consisting of methyl, ethyl, propyl, butyl, methyl ammonium, ethyl ammonium and ammonium groups, and the other hydrogens of the substituted alkylene group are unsubstituted, (c) cycloalkylene groups having at least 3 and at most about 12 carbon atoms, and (d)

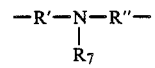

wherein $R_7$ is defined as $R_1$, $R_2$, $R_3$, $R_4$, $R_5$ and $R_6$ above with the proviso that the percentage of $R_1$, $R_2$, $R_3$, $R_4$, $R_5$, $R_6$, and $R_7$ being hydrogen does not exceed about 30, and R' and R" are independently selected from the group consisting of such unsubstituted alkylene groups, such substituted alkylene groups and such cycloalkylene groups; (iii) and n is an integer from 1 to about 25.

Surprisingly, it has been discovered that whereas conventional scale inhibiting compositions generally have been found to be ineffective or inadequate against formation of barite scale in acidic, aqueous environments, especially where the environment is of elevated temperature, N-phosphonomethylated amino-2-hydroxypropylene polymers corresponding to the above formula have been found to maintain their effectiveness against barite scale formation in such aqueous environments. Thus, the compositions of this invention are especially suited for oil and gas well production where the geothermal forces acting on the oil/water or gas/water mixtures to be pumped from the well typically result in a temperature of the mixture of 65° to 150° C. or more.

The effectiveness against barite scale formation in acidic environments of the N-phosphonomethylated amino-2-hydroxypropylene polymers and mixtures thereof of this invention is particularly surprising in view of the fact that other somewhat related compositions disclosed in Quinlan U.S. Pat. No. 4,051,110 have been found to be relatively ineffective against barite scale in acidic environments. The superiority of the polymers employed in the methods of the present invention is even more surprising considering that they have not been found to be noticeably superior to other compositions disclosed in Quinlan U.S. Pat. No. 4,051,110 when applied to non-acidic environments.

More specifically, the Quinlan patent '110 asserts that for the scale inhibition conditions of concern therein, complete phosphonomethylation of all available amine hydrogens is most preferred, and the working examples of the patent disclose polymers prepared from diethylenetriamine or higher polyethylenepolyamines, or mixtures thereof with smaller amounts of related polyamines. However, it now has been discovered that while a high degree of phosphonomethylation is desirable and certain compounds based on triamines might be effective to some extent in acidic environments, the identity of the polyamine, particularly that the polyamine is a diamine, and the mole ratio of epihalohydrin to polyamine play a significant role in determining the effectiveness of the composition. Further, although Quinlan patent '110 teaches that the effectiveness of the polymers disclosed therein increases with the degree of phosphonomethylation, with 100% phosphonomethylation being optimal, it has been discovered that optimal effectiveness of the present compositions actually is achieved at less than 100% phosphonomethylation, particularly 80% to 90%. Moreover, for certain scale-inhibiting applications, namely applications in acidic, aqueous environments, compounds based on certain diamines are more effective than compounds based on diethylenetriamine.

Thus, while certain N-phosphonomethylated amino-2-hydroxypropylene polymers corresponding to the above formula might technically fall within the broad generic disclosure of U.S. Pat. No. 4,051,110 to Quinlan, the Quinlan patent is directed more specifically to compositions not within the scope of this invention. Moreover, nothing in the Quinlan disclosure suggests that the particular compositions of the instant invention, in contrast to the other compositions disclosed by Quinlan, would maintain their effectiveness against barite scale formation in acidic environments. Not only that but it also has been found that the effectiveness of the compositions of the process of this invention against barite scale in acidic environments has not been achieved at the sacrifice of effectiveness against the formation of other scales. In fact, the compositions of this invention have been found to be as effective against other scales, such as calcium sulfate and calcium carbonate, as are prior art compositions.

Compositions employed in the scale inhibiting process of this invention may be produced in the following manner. First, an aqueous alkylamine, particularly an alkylene diamine or alkylene triamine solution, preferably an alkylene diamine, is mixed with an epihalohydrin in a polymerization reaction. A high degree of stirring blends the insoluble epihalohydrin with the alkylene diamine or alkylene triamine. However, the polymerization reaction produced thereby is relatively rapid, allowing low reaction times, typically about two hours. The alkylamine corresponds to the formula NH$_2$—R—NH$_2$, where R is an unsubstituted alkylene group having from about 2 to about 12 carbon atoms, a substituted alkylene group having at least about 2 and at most about 12 carbon atoms wherein at least one hydrogen of the alkylene group is substituted with a radical selected from the group consisting of methyl, ethyl, propyl, butyl, methyl ammonium, ethyl ammonium and ammonium groups, and the other hydrogens of the substituted alkylene group are unsubstituted, a cycloalkylene group having at least 3 and at most about 12 carbon atoms, or a radical corresponding to the formula

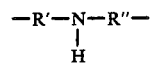

wherein R' and R" are independently selected from among such unsubstituted alkylene groups, such substituted alkylene groups and such cycloalkylene groups. Preferably, R is a straight chain alkylene group wherein the hydrogens of the alkylene group are unsubstituted or if at least one of the hydrogens of the alkylene group is substituted, each such hydrogen is substituted only with a methyl, ethyl, propyl, butyl, methyl ammonium, ethyl ammonium or ammonium group. Particularly preferred alkylene diamines are hexamethylenediamine, 1,4-butylenediamine, 1,2-ethylenediamine, 3-methylpentylenediamine and 2-methylpentylenediamine. However, where R is a triamine, preferred alkylene triamines include diethylenetriamine. The epihalohydrin corresponds to the formula:

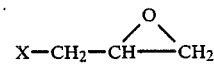

where X is a halogen. Preferably, the epihalohydrin is epichlorohydrin.

It is desired that the product of the polymerization reaction between the amine and the epihalohydrin has a high proportion of amine groups so that a relatively large number of amine sites are available for addition of phosphonic groups in a later process step involving a Mannich type reaction. Thus, in order to ensure a large proportion of amine groups in the product of the subject reaction, the alkylene diamine and epihalohydrin should be introduced to the reaction in a relative epihalohydrin to alkylene diamine molar ratio of at most about 1. Preferably, the molar ratio of epihalohydrin to alkylene diamine should be less than about 1, but at least about 0.5, and more preferably the epichlorohydrin to alkylene diamine molar ratio should be between about 0.7 and about 1, and still more preferably between about 0.8 and about 0.9. The water content of the reaction mixture has not been found critical to the progress of the reaction. However, it has been found that a water content of between about 20% by weight and about 50% by weight is desirable for other reasons. Specifically, water content that is too low leads to a reaction product that is overly viscous and is not suitable for convenient handling in later process steps. On the other hand, since the product of the polymerization reaction between the alkylamine and the epihalohydrin is utilized as a reactant in a later step which is to be carried out under very acidic conditions, if the water content of the reaction mixture is too high, the product likewise will have a high water content and excessive amounts of acid would have to be added to reduce the pH of the mixture to an appropriate level in the later step. Moreover, larger reaction vessels would be required to produce an equivalent amount of polymer.

The reaction between the amine and the epihalohydrin may be carried out as a continuously stirred batch tank reaction at between about 75° C. and about 85° C., preferably about 80° C., and atmospheric pressure for about two hours. Reaction temperatures above about 85° C. have been observed to convert the reaction mixture to a gel which encumbers handling and processing of the mixture.

At the end of the two hour reaction time, a yield of approximately 100% of a low molecular weight polymer with primary and secondary amino groups has been observed in the product of the polymerization reaction. The polymer has a molecular weight of from about 300 to about 5000 preferably from about 300 to about 2000 and corresponds to the formula:

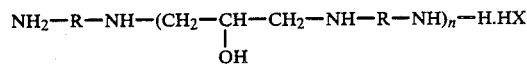

wherein R and X are defined as above. Preferably, as noted above, R is an alkylene group where the hydrogens of the alkylene group may be unsubstituted or at least one of the hydrogens of the alkylene group may be substituted with a methyl, ethyl, propyl, butyl, methyl ammonium, ethyl ammonium or ammonium group. Most preferably, R is a hexamethylene, tetramethylene, dimethylene, 2-methylpentamethylene, 3-methylpentamethylene, or diethyleneamine radical, and X is chlorine. Preferably, n is from about 1 to about 10.

The polymerization product thus produced by the polymerization reaction comprises an aqueous solution of between about 50% by weight and about 80% by weight of the low molecular weight polymer defined above. The polymerization reaction product is then mixed with phosphorous acid and enough of a second acid to produce a second reaction mixture having a pH below about 1. A second, or Mannich type, reaction is thereby initiated. The second reaction and the polymerization reaction may take place in the same reaction tank. Therefore, the polymerization product need not be transfered out of the tank reactor used for the polymerization reaction, but the polymerization product may be mixed with the phosphorous acid and second acid simply by adding the acids to the polymerization product in the reaction tank.

Since it is desired that the second reaction mixture have a pH below about 1, the second acid should be a relatively strong acid such as hydrochloric acid or sulfuric acid. The ultimate scale inhibiting product may contain the anion of the acid. Thus, since certain anions such as the sulfate anion might tend to combine with ambient cations to form insoluble scale such as barium sulfate when the product is used for scale inhibition, it is preferable that the acid not contain such precipitate-forming anions. Accordingly, hydrochloric acid is particularly appropriate for the second acid.

It has been observed that a molar ratio of hydrochloric acid to amine of at least about 2 is sufficient to reduce the pH of the mixture to below about 1. The phosphorous acid should be added to the polymerization reaction product in a phosphorous acid to amine NH equivalent molar ratio in the mixture of between about 0.6 and about 1, preferably between about 0.7 and about 1, more preferably between about 0.75 and about 1, most preferably about 0.8 to about 0.9. The polymerization product, phosphorous acid and second acid mixture is heated to reflux, about 100° to about 105° C., and then formaldehyde (typically in a commercial solution such as formalin, which is a 37% by weight aqueous solution of formaldehyde) in at least the same molar amount as the phosphorous acid, and preferably a molar amount slightly greater than the phosphorous acid, is added slowly, generally over a half hour period, to the mixture to initiate a Mannich type reaction. Heating of the resulting mixture is continued until the total heating time reaches between about 2 and about 4 hours.

At the end of the heating time, the Mannich reaction has been observed to reach a yield near 100%. Thus, the product of the Mannich type reaction comprises an aqueous solution of generally between about 30% by weight and about 40% by weight, typically about 35% by weight, N-phosphonomethylated amino-2-hydroxypropylene polymer having a molecular weight of at least about 300 and at most about 5000 and corresponding to the formula:

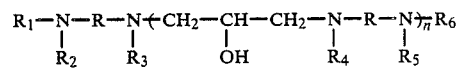

wherein (i) $R_1$, $R_2$, $R_3$, $R_4$, $R_5$ and $R_6$ are independently selected from hydrogen and phosphonomethyl radical corresponding to the formula $-CH_2PO(OH)_2$, with the proviso that at most about 30% of $R_1$, $R_2$, $R_3$, $R_4$, $R_5$, and $R_6$ are hydrogen; (ii) R is a divalent radical selected from the group consisting of (a) unsubstituted alkylene groups having at least about 2 and at most about 12 carbon atoms, (b) substituted alkylene groups having at least about 2 and at most about 12 carbon atoms wherein at least one hydrogen of the alkylene group is substituted with a radical selected from the group consisting of methyl, ethyl, propyl, butyl, methyl ammonium, ethyl ammonium and ammonium groups, and the other hydrogens of the substituted alkylene group are unsubstituted, (c) cycloalkylene groups having at least 3 and at most about 12 carbon atoms, and (d)

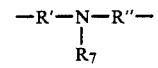

where $R_7$ is defined as $R_1$, $R_2$, $R_3$, $R_4$, $R_5$ and $R_6$ above with the proviso that the percentage of $R_1$, $R_2$, $R_3$, $R_4$, $R_5$, $R_6$ and $R_7$ being hydrogen not exceed about 30, and R' and R" are independently selected from the group consisting of such unsubstituted alkylene groups, such substituted alkylene groups and such cycloalkylene groups; and (iii) n is between about 1 and about 25. Preferably, R is a straight chain alkylene group wherein the hydrogens of the alkylene group are unsubstituted or wherein at least one of the hydrogens of the alkylene group is substituted with a methyl, ethyl, propyl, butyl, methyl ammonium, ethyl ammonium or ammonium group. If at least one of the hydrogens is so substituted, preferably the other hydrogens of the alkylene group are unsubstituted. Particularly preferred $-N-R-N-$ groups are based on alkylenediamines, including hexamethylenediamine, 1,4-butylenediamine, 1,2-ethylenediamine, 3-methylpentamethylenediamine and 2-methylpentamethylenediamine. However, where $-N-R-N-$ is derived from a triamine, preferred alkylene triamines include diethylenetriamine. It has been found that if R is a hydroxyalkyl group, such as 2-hydroxypropylene the polymer tends to be relatively less water-soluble than the polymers wherein R is as defined above. In addition, polymers wherein R is a cyclic group have been found to be less effective than polymers wherein R is an alkyl group.

The Mannich type reaction product further comprises excess phosphorous acid, formaldehyde, low molecular weight polymer and the second acid. If desired, this product may be neutralized to a desired extent by addition of almost any base, such as sodium hydroxide or an alkanolamine. Upon addition of the base, water treating acceptable salts of the polymer may thereby be formed by replacement of significant numbers of hydroxyl hydrogens in the phosphonomethyl groups.

Preferably, at least about 70%, optimally about 80% to about 90%, of the amine substituents $R_1$, $R_2$, $R_3$, $R_4$, $R_5$, $R_6$ and $R_7$, are phosphonomethyl groups corresponding to the formula —$CH_2PO(OH)_2$ or water treating acceptable salts analogs thereof. Such salts, including partial salts, contain substituted phosphonomethyl groups corresponding to the formula —$CH_2PO(OM)_2$ where each M is independently selected from the group consisting of hydrogen, an alkali metal, an alkyl ammonium group (especially of from about 1 to about 6 carbon atoms), a hydroxyalkylammonium group (especially of from about 1 to about 6 carbon atoms), and ammonium. Thus, the salt analogs of the phosphonomethyl group —$CH_2PO(OH)_2$ corresponds to the formula —$CH_2PO(OM)_2$. Most preferably, M is sodium.

Several N-phosphonomethylated amino-2-hydroxypropylene polymers are listed in the following table, together with the amine and the epichlorohydrin to amine molar ratio employed in the preparation of the N-phosphonomethylated amino-2-hydroxypropylene polymer. Compound numbers have been assigned to each compound and are used throughout the balance of the application.

TABLE 1

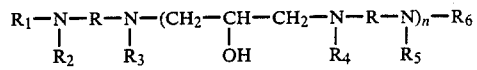

(where an average of 70% to 100% of $R_1$, $R_2$, $R_3$, $R_4$, $R_5$ and $R_6$ in a mixture of the compound correspond to the formula —$CH_2PO(OH)_2$, the remaining $R_1$, $R_2$, $R_3$, $R_4$, $R_5$ and $R_6$ which do not correspond to the formula —$CH_2PO(OH)_2$ are hydrogen, and n is between about 1 and about 10, preferably about 1 to about 3.

| Compound No. | R | Amine | E/A | P/A |
|---|---|---|---|---|
| 1 | —$C_2H_4NHC_2H_4$— | DETA | 0.70 | 1.00 |
| 2 | —$C_2H_4NHC_2H_4$— | DETA | 0.70 | 0.77 |
| 3 | —$C_2H_4NHC_2H_4$— | DETA | 1.00 | 0.78 |
| 4 | —$C_2H_4$— | EDA | 0.70 | 0.90 |
| 5 | —$C_2H_4$— | EDA | 0.90 | 0.90 |
| 6 | —$CH_2$—CH(OH)—$CH_2$— | HPDA | 0.70 | 1.00 |
| 7 | —$CH_2$—CH(OH)—$CH_2$— | HPDA | 0.80 | 1.00 |
| 8 | —$C_4H_8$— | BDA | 0.70 | 0.86 |
| 9 | —$CH_2$—CH($CH_3$)—$C_3H_6$— | MPDA | 0.50 | 1.00 |
| 10 | —$CH_2$—CH($CH_3$)—$C_3H_6$— | MPDA | 0.80 | 1.00 |
| 11 | —$C_6H_{12}$— | HDA | 0.60 | 0.82 |
| 12 | —$C_6H_{12}$— | HDA | 0.70 | 0.87 |
| 13 | —$C_6H_{12}$— | HDA | 0.80 | 0.79 |
| 14 | —$C_6H_{12}$— | HDA | 0.65 | 0.90 |
| 15 | —$C_2H_4NHC_2H_4$— | DETA | 0.90 | |
| 16 | —$C_2H_4NHC_2H_4$— | DETA | 0.80 | |

TABLE 1-continued

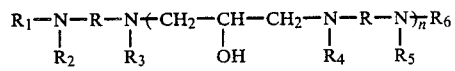

(where an average of 70% to 100% of $R_1$, $R_2$, $R_3$, $R_4$, $R_5$ and $R_6$ in a mixture of the compound correspond to the formula —$CH_2PO(OH)_2$, the remaining $R_1$, $R_2$, $R_3$, $R_4$, $R_5$ and $R_6$ which do not correspond to the formula —$CH_2PO(OH)_2$ are hydrogen, and n is between about 1 and about 10, preferably about 1 to about 3.

| Compound No. | R | Amine | E/A | P/A |
|---|---|---|---|---|
| 17 | ⟨S⟩— and ⟨S⟩ | Millamine | 0.70 | |
| 18 | ⟨S⟩— and ⟨S⟩ | Millamine | 0.80 | |
| 19 | ⟨S⟩— and ⟨S⟩ | Millamine | 0.90 | |

Note:
E/A is the epichlorohydrin to amine molar ratio; P/A is the molar ratio of phosphorus to total amine hydrogen: DETA is diethylenetriamine; EDA is 1,2-ethanediamine; HPDA is 2-hydroxypropane-1,3-diamine; BDA is 1,4-butanediamine; MPDA is 2-methylpentane-1,5-diamine; HDA is 1,6-hexamethylenediamine; and Millamine is a commercial mixture of cyclohexane-1,2-diamine and cyclohexane-1,3-diamine.

While the Mannich type reaction product may be used directly as a scale inhibiting composition, the reaction product is highly acidic, particularly when the N-phosphonomethylated amino-2-hydroxypropylene polymer is present in an acid form. Thus, it may be desirable for ease of handling that a base be added to the composition to form a treated composition of more nearly neutral pH, generally between about 3 and about 10. Acceptable bases include sodium hydroxide, potassium hydroxide, and amines such as ethanolamine, diethanolamine, triethanolamine, diethylamine, and triethylamine. The acid form of N-phosphonomethylated amino-2-hydroxypropylene polymer treated with the base therefore produces a salt of the phosphonic acid, the salt corresponding to the formula:

$$R_1-N(R_2)-R-N(R_3)+CH_2-CH(OH)-CH_2-N(R_4)-R-N(R_5)\overline{\smash{)}_n}R_6$$

where R, $R_1$, $R_2$, $R_3$, $R_4$, $R_5$ and $R_6$ and n are defined as above. Preferably, the base is sodium hydroxide and a sodium salt is formed thereby. Thus, the composition as applied for barite scale inhibition may comprise the phosphonic acid salt as well as the phosphonic acid.

In addition, a freezing point depressant, such as methanol, ethylene glycol or isopropanol may be added to the composition or treated composition, to avoid freezing of the composition before contact with warm underground fluids. Typically, the scale inhibiting composition is diluted before use as a barite scale inhibitor. The expanded solution thereby produced comprises between about 20% by weight and about 30% by weight phosphonic acid or its salt.

In operation, for example in oil or gas fields, the composition is injected or otherwise delivered into the reservoir to provide a concentration of phosphonic acid or salt in the mixture in the conduit of between about 1 ppm and about 100 ppm to inhibit barite formation. It has been found that the phosphonic acid or salts of this invention are effective in pH 2 to 10, preferably pH of 3 to 6, warm, e.g., 65°–150° C., environments.

The following examples illustrate the invention.

EXAMPLE 1

Water (46.5 g) was added to hexamethylenediamine (46.5 g) in a 500 ml 3-necked glass flask fitted with a reflux condenser, a mechanical stirrer, a thermometer and an addition funnel. The solution in the flask was heated to 80° C. The flask was placed in a water bath. Epichloohydrin (24 g) was added to the flask with vigorous stirring and at such a rate (5 to 7 minutes) that the temperature of the reaction mixture stayed between 75° and 83° C. even though the addition of epichlorohydrin is very exothermic. After addition of the epichlorohydrin, the water-bath was replaced with a heat source. The reaction mixture was heated at 80° C. for two hours. At the end of two hours, a 100 percent yield was observed of a low molecular weight polymer corresponding to the following formula:

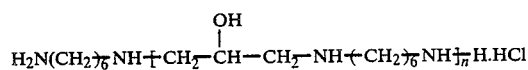

where n averaged about 1.86.

EXAMPLE 2

In a 300 ml 3-necked glass flask fitted with a reflux condenser, a magnetic stirrer, a thermometer and an addition funnel, 71% phosphorous acid (19 g) and concentrated hydrochloric acid (8.4 g) were added to a sample (20 g) of the low molecular weight polymer produced by the reaction of Example 1. The reaction mixture was heated to reflux (about 105° C.) and then 37% formaldehyde (13.5 g) was added dropwise over a 30 minute period. The reaction mixture was heated at reflux (about 105° C.) for an additional four hours after the completion of the addition of formaldehyde. The reaction mixture was then cooled to 20° to 25° C. and stored as an acid mass. It was observed that about 90 percent of the amine NH groups of the polymer were phosphonomethylated.

EXAMPLE 3

The effectiveness of various barite scale inhibitor solutions in various pH environments was studied. To each of several 15 ml capacity culture tube, was added between 0 and 0.1 ml of a diluted inhibitor solution, 0.1 ml of a buffer solution, 5 ml of a sulfate containing solution, 5 ml of a barium containing solution, and 1 ml of a well stirred solution containing barite "seed" crystals in suspension. The buffer solution was selected from among a pH 3.6 buffer solution containing one molar formic acid with approximately 0.3M sodium hydroxide, a pH 4.0 buffer solution containing one molar formic acid with approximately 0.65 molar sodium hydroxide, a pH 5.5 buffer solution containing one molar piperazine with approximately 1.6 molar hydrochloric acid, and a pH 7.0 buffer solution containing one molar imidazole and approximately 0.5 molar hydrochloric acid. Two types of solution were used. In some tubes, a simple 2.2M sodium chloride brine was used, while in others a complex salt water brine was used. The simple sodium chloride brine was prepared by mixing a sulfate solution of 0.33 grams of sodium sulfate (anhydrous) per liter water with a simple sodium/barium solution prepared by mixing 283 grams of sodium chloride per liter water with 0.12 grams barium chloride (dihydrate) with water. The complex brine sulfate solution was prepared by mixing a sulfate solution of 78 grams of sodium chloride per liter water, 1.23 grams of sodium sulfate (anhydrous) per liter water, 1.28 grams potassium chloride per liter water and 0.19 grams of sodium bromide per liter water with a complex brine barium solution prepared by mixing 9.2 grams magnesium chloride (hexahydrate) per liter water with 8.2 grams calcium chloride (dihyrate) per liter water and 0.68 grams strontium chloride (dihydrate) per liter water and 0.12 grams barium chloride (dihydrate) per liter water. The barite "seed" solution was prepared by slowly neutralizing 5.6 grams of barium hydroxide (octahydrate) per liter water with 0.5M sulfuric acid and allowing the solution to stand 30 days or more before use.

For tests conducted at about 80° C., the barite "seed" was not added until after the mixture in the culture tube had been heated for five minutes in an 80° C. bath.

After addition of the seed, the tubes were capped and placed on their sides in a thermostatted bath, and gently rocked to keep the seed in suspension for one hour. Immediately upon removal from the bath, an aliquot (0.1 ml) of a two percent solution of diethylenetriamine pentamethylene phosphonic acid (DETP$_5$), a commercial inhibitor of barite for use in neutral pH, was added to each tube. The DETP$_5$ solution further contained one molar trishydroxymethylaminomethane to shift the pH of the mixture in the tube into the neutral range.

The addition of the commercial inhibitor prevented further precipitation of barite after the tubes were removed from the bath. The resulting mixtures were filtered through a 0.45 micron filter to remove solids. The amount of barium remaining in solution was determined on diluted aliquots by atomic emission spectometry using a DC plasma spectrophotometer calibrated using matrix matched standards. The barite inhibition results are shown in the following two tables. With the simple sodium chloride brine, uninhibited samples retained only 4 ppm of barium in solution, while completely inhibited samples retained 28 ppm of barium in solution. For the more severe scaling conditions employed using the more complex brine, the corresponding numbers are 2 ppm and 30 ppm. In both cases the mean is 16 ppm, which corresponds to 50 percent protection.

The inhibitors were tested in a series where each level tested was $10^{1/5}$ times the next lower level. A log of the concentration verses percent protection plot is generally steepest and fairly linear between 20 and 80 percent protection. A log-linear interpolation between the points straddling 16 ppm barium was used to determine the concentration in ppm of compound required for 50 percent protection. These interpolated numbers are entered in the tables below. Note that Compound Nos. 1, 2 and 3 are based on diethylenetriamine as opposed to the diamines of Compound Nos. 4 through 14, and that the epichlorohydrin of amine molar ratio of Compound No. 9 is only about 0.50.

TABLE 2 ppm Active Compound Required for 50% Protection Against Barite Precipitation in a Simple 2.2M NaCl Brine

| Compound No. | 40° C. pH 7 | 40° C. pH 4 | 80° C. pH 4 |
|---|---|---|---|
| 1 | 0.52 | 9. | 4.9 |
| 2 | 0.53 | 12. | 6.1 |
| 3 | 0.57 | 11. |  |
| 6 | 1.1 | 2.7 |  |
| 7 | 1.1 | 2.2 |  |
| 8 | 0.94 | 2.8 | 1.9 |
| 9 | 0.53 | 8.8 | 9.0 |
| 10 | 0.78 | 2.1 | 3.3 |
| 11 | 0.43 | 2.6 | 2.6 |
| 12 | 0.54 | 3.0 | 3.0 |
| 13 | 0.80 | 3.3 | 3.3 |

TABLE 3 ppm Active Compound Required for 50% Protection Against Barite Precipitation in a Complex Salt Water.

| Compound No. | 40° C. pH 7 | 40° C. pH 4 | 80° C. pH 3.6 |
|---|---|---|---|
| 1 | 4.8 | 60 | 70 |
| 4 | 3.4 | 22 |  |
| 5 | 3.4 | 22 |  |
| 8 |  |  | 30 |
| 9 | 5.3 | 74 |  |
| 11 | 3.2 | 23 |  |
| 12 | 3.3 | 23 | 70 |
| 13 | 5.4 | 31 | 70 |
| 14 | 2.7 | 16 | 60 |

EXAMPLE 4

An N-phosphonomethylated amino-2-hydroxypropylene polymer solution was prepared. First, a solution containing hexamethylenediamine (HDA) (about 46 g) in water (about 139 g) was placed in a 3-necked flask fitted with a thermometer, mechanical stirrer, reflux condenser and a dropping funnel The solution was heated to about 80° C. The heat source was then removed and epichlorohydrin (about 30 g.) was added at a rate such that the temperature of the reaction mixture stayed between about 78° and 82° C. (35-40 minutes). After completion of the addition of epichlorohydrin, the reaction mixture was held at 80° C. for about 3 hours Other polymer solutions, as shown in Table 4, were also prepared by similar procedure.

The amine abbreviations in the table are the same as those set forth in Table 1 of the specification, and E/A is the epichlorohydrin to amine molar ratio.

TABLE 4

| Intermediate No. | Amine | Amine (g) | Water (g) | Epichlorohydrin (g) | E/A |
|---|---|---|---|---|---|
| a | HDA | 46.4 | 139.4 | 29.6 | .80 |
| b | Millamine | 45.6 | 45.6 | 25.9 | .70 |
| c | BDA | 17.6 | 17.6 | 12.95 | .70 |
| d | DETA | 41.4 | 41.4 | 25.9 | .70 |
| e | MPDA | 46.4 | 46.0 | 18.5 | .50 |
| f | HDA | 46.48 | 46.48 | 24.06 | .65 |

The components listed in Table 5 were the noted polymers produced in the first reaction and the amounts shown in Table 5 with water, phosphorous acid and concentrated hydrochloric acid in the amounts shown in Table 5, and the mixture was heated to boiling. Formalin in the amounts shown in Table 5 was then added drop wise over one hour. After completion of the addition of formaldehyde, the mixture was efluxed for 3-4 hours.

TABLE 5

| Cmpd. No. | Intermediate No. | Polymer (g) | $H_3PO_3$ (g) | $H_2O$ (g) | Conc. HCl (g) | 37% $CH_2O$ (g) |
|---|---|---|---|---|---|---|
| 13 | a | 20 | 5.8 | 17 | 15 | 11.44 |
| 17 | b | 20 | 10.23 | 24.7 | 24.7 | 20.21 |
| 8 | c | 20 | 15.14 | 36.5 | 36.5 | 30.48 |
| 2 | d | 20 | 16.63 | 39.5 | 39.5 | 32.3 |
| 9 | e | 20 | 17.7 | 42.8 | 42.8 | 35.0 |
| 14 | f | 20 | 13.62 | 24.84 | 32.94 | 13.5 |

EXAMPLE 5

Each of several low sodium chloride brine barite tests at 40° C. was conducted as follows. Two solutions, a sulfate solution and a barium solution, were prepared. The sulfate solution was 0.3 ml of 1M $Na_2SO_4$ and 11 g of NaCl diluted to 1.0 L. The barium solution was 0.3 ml of 1M $BaCl_2$ and 11.1 g of NaCl diluted to 1.0 L. Three types of buffer solutions were prepared. The pH 4 0 buffer solution contained 1.0M formic acid and approximately 0.65M sodium hydroxide. The pH 5.5 buffer solution contained 1.0M piperazine and about 1.6M hydrochloric acid. The pH 7.0 buffer solution contained 1.0M imidazole and about 0.5M hydrochloric acid. A barite seed solution was also prepared containing 4.0 g barite per liter prepared by neutralization of $Ba(OH)_2$ solution (5.6 g $Ba(OH)_2$ $8H_2O$ per liter) with 0.5M sulfuric acid and allowed to sit at least 30 days.

Inhibitor solution (up to 0.1 ml), buffer solution (0.1 ml), the sulfate solution (5 ml), the barium solution (5 ml) were mixed in a test tube, and then 1.0 ml of seed slurry was added to the test tube. The test tube was immersed in a thermostated bath and gently rocked for one hour. The solutions were then filtered and diluted The ppm $Ba^{2+}$ in the original solution was determined by DC Plasma atomic emission spectrometry. With 100% inhibition there should be 18 ppm $Ba^{2+}$ in solution and 0% inhibition leaves 6 ppm $Ba^{2+}$.

Each of several high sodium chloride brine tests was conducted according to the low sodium chloride brine procedure, except that the sulfate solution contained 0.33 g $Na_2SO_4$ (anhydrous) per liter water, add the barium solution was 283 g sodium chloride and 0.5 ml per liter water of 1.0M $BaCl_2$.

For 80° C. tests in high or low sodium chloride brine, the same solutions were used, but with a slight change in procedure. Just before addition of the seed solution, the tube was placed uncapped standing upright in a 80° C. bath for five minutes to preheat the solution. Then seed slurry was added and the tube capped and set on its sides angled with the capped end of the tube higher than the bottom for an additional five minutes to heat the air space and to allow pressurized air to escape. Immediately upon removal from the bath after one hour of rocking, extra inhibitor "stopper" solution (0.1 ml) was added to the tube. The stopper solution was 2% DETP$_5$ in 1M tris(hydroxymethyl)aminomethane. Filtration, etc., was then carried out as for the 40° C. tests.

To explore further the barite inhibiting power of the compounds, a more realistic brine was developed based on what might be found when a mid-range North Sea connate water is mixed with sea water. The composition is given in Table 6. The brine was formed by mixing a sulfate solution comprising sodium chloride (78 g), anhydrous sodium sulfate (2.23 g), potassium chloride (1.28 g) and sodium bromide (0.19 g) with a barium solution comprising magnesium chloride hexahydrate (9.3 g), dihydrous calcium chloride (8.2 g), dihydrous strontium chloride (0.68 g), and dihydrous barium chloride (0.12 g) or 1.0M BaCl$_2$ (0.48 ml).

TABLE 6

| Ion | Mg/L | | Calculated Saturation Indices | | | |
|---|---|---|---|---|---|---|
| | | | 20° C. | 40° C. | 80° C. | 120° C. |
| SO$_4^{2-}$ | 400 | Barite | 2.35 | 2.02 | 1.42 | 0.89 |
| Cl− | 24,850 | Celestite | −.43 | −.43 | −.34 | −.20 |
| Br− | 65 | Anhydrite | −1.59 | −1.38 | −.98 | −.55 |
| Na+ | 14,000 | | | | | |
| K+ | 300 | | | | | |
| Mg$^{2+}$ | 500 | | | | | |
| Ca$^{2+}$ | 1,000 | | | | | |
| Sr$^{2+}$ | 100 | | | | | |
| Ba$^{2+}$ | 30 | | | | | |

Compound activities were calculated on the bases of the charge-neutral free acid (for the phosphonic acids) or the free base (for the polymer). All results are reported in terms of the concentration of active material based on these calculations. It was assumed that all the epichlorohydrin reacts with the amine with the expulsion of one mole of hydrogen chloride per mole of epichlorohydrin. For the phosphonation reaction it was assumed that all the phosphorous acid reacts, and one mole of formaldehyde is included per mole of phosphorous acid with the expulsion of one mole of water. The calculated activities are shown in Table 7 where P/A is defined as in Table 1 above.

TABLE 7

| Compound # | P/A | % P in the Compound | % Active |
|---|---|---|---|
| 13 | 0.79 | 17.3 | 18.3 |
| 17 | 0.70 | 16.9 | 22.3 |
| 8 | 0.86 | 20.5 | 20.2 |
| 2 | 0.77 | 21.2 | 20.0 |
| 9 | 1.00 | 21.7 | 19.5 |
| 14 | 0.90 | 19.7 | 25.0 |

The barite inhibition results using the initial inhibitors in the high and low sodium chloride brine are summarized in Table 8. Quantities in parentheses are extrapolated from measured data.

TABLE 8

| | 40° C. Barite Inhibition ppm Compd. Required for 50% Protection | | | | |
|---|---|---|---|---|---|
| | High Sodium Chloride Brine | | | Low Sodium Chloride Brine | |
| Comp. | pH 7.0 | pH 5.5 | pH 4.0 | pH 5.5 | pH 4.0 |
| 1 | 0.52 | — | 9.0 | — | — |
| 2 | 0.53 | 0.67 | 12. | 0.70 | (3) |
| 16 | 0.53 | 0.61 | 11. | 0.70 | (3) |
| 15 | 0.53 | 0.56 | 5.1 | 0.61 | (2) |
| 3 | 0.57 | 0.67 | 11. | 0.85 | (3) |
| 17 | 1.2 | 2 | 13 | 1.5 | (30) |
| 18 | 1.1 | 2 | 13 | 1.8 | (30) |
| 19 | 1.2 | 2 | 13 | 2.0 | (30) |
| 8 | 0.94 | 0.86 | 2.8 | 0.80 | 2.5 |

TABLE 8-continued

| | 40° C. Barite Inhibition ppm Compd. Required for 50% Protection | | | | |
|---|---|---|---|---|---|
| | High Sodium Chloride Brine | | | Low Sodium Chloride Brine | |
| Comp. | pH 7.0 | pH 5.5 | pH 4.0 | pH 5.5 | pH 4.0 |
| 9 | 0.53 | — | 8.8 | — | — |
| 10 | 0.78 | — | 2.1 | — | — |
| 11 | 0.43 | 0.59 | 2.6 | 0.60 | 1.8 |
| 12 | 0.54 | 0.59 | 3.0 | 0.59 | 1.8 |
| 13 | 0.80 | 0.85 | 3.3 | 0.82 | 2.9 |
| DETP$_5$ | 0.32 | — | High | — | — |
| LMW45N* | 0.53 | — | 2.0 | — | — |

*a polyacrylic acid sold by Rohm and Haas

The North Sea Brine Barite Inhibition tests were run at only pH 5.5 and 4.0. The results are shown in Table 9. Several other compounds were run for comparison.

TABLE 9

| Barite Inhibition in a North Sea Type Brine ppm Compd. Required for 50% Protection | | | |
|---|---|---|---|
| | 40° C. | | 80° C. |
| Compound | pH 5.5 | pH 4.0 | pH 4.0 |
| 1 | 4.8 | 60 | 90 |
| 15 | 4.3 | 63 | — |
| 9 | 5.3 | 74 | — |
| 11 | 3.2 | 23 | — |
| 12 | 3.3 | 23 | — |
| 13 | 5.4 | 31 | — |
| 14 | 3.4 | 18.8 | — |
| DETP$_5$ | 2.7 | 79 | 10 |
| LMW45N* | 3.1 | 300 | — |
| HEDP** | 8.1 | 300 | — |

*polyacrylic acid sold by Rohm and Haas
**hydroxyethylidene diphosphonic acid

A limited number of barite inhibition tests were run at pH 4 at 80° C. Some were run in high sodium chloride brine. The results are shown in Table 10. Additional tests were run in the more severe North Sea brine. These results are shown in Table 9.

TABLE 10

| Barite Inhibition in the High Sodium Chloride Brine at 80° C. at pH 4. | |
|---|---|
| Compound | ppm Compd. for 50% Protection |
| 1 | 4.9 |
| 2 | 6.1 |
| 15 | 5.8 |
| 8 | 1.9 |
| 9 | 9.0 |
| 10 | 3.3 |
| 11 | 2.6 |
| 12 | 3.0 |
| 13 | 3.3 |
| DETP$_5$ | 8.0 |
| LMW45N* | 8.9 |

*a polyacrylic acid sold by Rohm and Haas

Calcite Inhibition tests were run at 40° C. in the high and low sodium chloride brine. The results are shown in Table 1. Gypsum Inhibition tests were also conducted at 40° C. in the high sodium chloride brine only. These results are also shown in Table II.

TABLE 11

| Calcite and Gypsum Test Results at 40° C. ppm Compd Required for 50% Protection | | | |
|---|---|---|---|
| | Calcite Inhibition | | |
| Compound | High Brine | Low Brine | Gypsum Inhibition |
| 1 | — | — | 20 |
| 2 | 2.3 | 1.4 | 18 |
| 16 | 2.3 | 1.6 | 18 |

TABLE 11-continued

| Compound | Calcite and Gypsum Test Results at 40° C. ppm Compd Required for 50% Protection | | |
|---|---|---|---|
| | Calcite Inhibition | | |
| | High Brine | Low Brine | Gypsum Inhibition |
| 15 | 2.3 | 1.4 | 19 |
| 3 | 2.4 | 1.8 | 20 |
| 17 | 2.3 | 2.0 | — |
| 18 | 4.2 | 2.4 | — |
| 19 | 4.1 | 3 | — |
| 8 | 3.7 | 2.2 | 16 |
| 9 | — | — | 14 |
| 10 | — | — | 15 |
| 11 | 2.3 | 1.7 | 15 |
| 14 | — | — | 18 |
| 12 | 2.1 | 2.2 | 16 |
| 13 | 3 | 3.1 | 18 |
| HMDP$_4$* | — | — | 13 |
| DETP$_5$ | 2 | 1.7 | 18 |

*HMDP$_4$ Hexamethylene diamine tetramethylene phosphonic acid

Solubility tests were run on the initial set of compounds. The results are shown in Table 12. The entry "P" indicates that a heavy precipitate formed; the transmittance was not measured. The percent transmittance in a 1 cm curvette is listed when that was measured.

TABLE 12

| | Solubility of Test Compounds in Synthetic Brines | | | | | | | | | | |
|---|---|---|---|---|---|---|---|---|---|---|---|
| | Fresh Water | | | Salty Water | | | Low Calcium Brine | | | High Calcium Brine | | |
| Compound | 5.5 | 7.0 | 8.5 | 5.5 | 7.0 | 8.5 | 5.5 | 7.0 | 8.5 | 5.5 | 7.0 | 8.5 |
| 13 | 100 | — | 100 | P | — | P | P | P | — | — | — | — |
| 12 | 100 | — | 100 | P | — | P | P | 12 | — | — | — | — |
| 11 | 100 | — | 100 | P | — | P | P | 31 | — | — | — | — |
| 17 | — | — | — | — | — | — | — | 100 | 67 | — | P | — |
| 18 | — | — | — | — | — | — | — | 100 | 61 | — | P | — |
| 19 | — | — | — | — | — | — | — | 100 | 77 | — | P | — |
| 8 | 100 | — | 100 | P | — | P | P | 15 | — | — | — | — |
| 16 | — | — | — | — | — | — | — | 100 | 100 | — | P | — |
| 15 | — | — | — | — | — | — | — | 100 | 71 | — | P | — |
| 3 | — | — | — | — | — | — | — | 100 | 100 | — | P | — |
| 2 | — | — | — | — | — | — | — | 100 | 100 | — | P | — |
| 20 | — | — | — | — | — | — | 100 | 89 | 55 | — | — | — |
| 21 | — | — | — | — | — | — | 100 | 91 | 54 | — | — | — |
| DETP$_5$ | 99 | 99 | 98 | 0 | 2 | 3 | 2 | 10 | 1 | 7 | 4 | 2 |

In the view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A method for inhibiting of barite scale formation in an aqueous environment, the method comprising introducing an effective amount of a barite scale inhibiting composition to an aqueous environment susceptible to barite formation, said environment having a pH of at least about 2 and at most about 10, and said barite scale inhibiting composition comprising an N-phosphonomethylated amino-2-hydroxypropylene polymer corresponding to the formula:

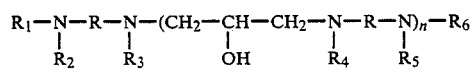

wherein (i) $R_1$, $R_2$, $R_3$, $R_4$, $R_5$ and $R_6$ are independently selected from the group consisting of hydrogen, phosphonomethyl radical corresponding to the formula —CH$_2$PO(OH)$_2$, and water treating acceptable salts of such phosphonomethyl radical, with the proviso that the percentage of $R_1$, $R_2$, $R_3$, $R_4$, $R_5$ and $R_6$ being hydrogen does not exceed about 30; (ii) R is a divalent radical selected from the group consisting of (a) unsubstituted alkylene groups having at least about 2 and at most about 12 carbon atoms atoms, (b) substituted alkylene groups having at least about 2 and at most about 12 carbon atoms wherein at least one hydrogen of the alkylene group is substituted with a radical selected from the group consisting of methyl, ethyl, propyl, butyl, methyl ammonium, ethyl ammonium and ammonium groups, and the other hydrogens of the substituted alkylene group are unsubstituted, (c) cycloalkylene groups having at least about 3 and at most about 12 carbon atoms, and (d)

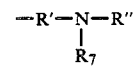

wherein $R_7$ is defined as $R_1$, $R_2$, $R_3$, $R_4$, $R_5$ and $R_6$ above, with the proviso that the percentage of $R_1$, $R_2$, $R_3$, $R_4$, $R_5$, $R_6$ and $R_7$ being hydrogen not exceed about 30, and R' and R" are independently selected from the group consisting of (a) unsubstituted alyklene groups having at least about 2 and at most about 12 carbon atoms atoms, (b) substituted alkylene groups having at least about 2 and at most about 12 carbon atoms wherein at least one hydrogen of the alkylene group is substituted with a radical selected from the group consisting of methyl, ethyl, propyl, butyl, methyl ammonium, ethyl ammonium and ammonium groups, and the other hydrogens of the substituted alkylene group are unsubstituted, and (c) cycloalkylene groups having at least about 3 and at most about 12 carbon atoms; and (iii) n is from about 1 to about 25.

2. A method as set forth in claim 1, wherein between about 70% and about 100% of said $R_1$, $R_2$, $R_3$, $R_4$, $R_5$, and $R_6$ of the polymer in the mixture correspond to the formula —CH$_2$PO(OM)$_2$, wherein each M is independently selected from the group consisting of hydrogen, alkali metals, alkyl ammonium groups, hydroxyalkylammonium groups and ammonium.

3. A method as set forth in claim 1, wherein R is selected from the group consisting of unsubstituted straight chain alkylene groups having between about 2 and about 6 carbon atoms and straight chain alkylene groups having between about 2 and about 6 carbon atoms wherein at least one of the hydrogens of the alkylene group is substituted with a radical selected from the group consisting of methyl, ethyl, propyl, butyl, methyl ammonium, ethyl ammonium and ammonium groups and the other hydrogens of the substituted alkylene group are unsubstituted.

4. A method as set forth in claim 1, wherein the temperature of said aqueous environment is at least about 65° C.

5. A method as set forth in claim 1, wherein n is at least 1 and at most about 10.

* * * * *

UNITED STATES PATENT AND TRADEMARK OFFICE
CERTIFICATE OF CORRECTION

PATENT NO. : 4,857,205
DATED : 1989 August 15
INVENTOR(S) : Derek Redmore; Balram Dhawan; John L. Przybylinski It is certified that error appears in the above-identified patent and that said Letters Patent is hereby corrected as shown below:

In Column 9, line 58 (Table I, Column E/A, line 14), the number "0.86" should be moved to Column 9, line 57 (Table I, Column P/A, line 13)

In Column 13, line 62, after the words "Table 5 were" insert the words --then produced by mixing--.

In Column 18, line 44, delete the word "alyklene" and insert the word --alkylene--.

Signed and Sealed this

Seventh Day of August, 1990

*Attest:*

HARRY F. MANBECK, JR.

*Attesting Officer*      *Commissioner of Patents and Trademarks*